(12) United States Patent
Ramachandra Iyer

(10) Patent No.: US 11,775,857 B2
(45) Date of Patent: Oct. 3, 2023

(54) METHOD AND SYSTEM FOR TRACING A LEARNING SOURCE OF AN EXPLAINABLE ARTIFICIAL INTELLIGENCE MODEL

(71) Applicant: WIPRO LIMITED, Bangalore (IN)

(72) Inventor: Manjunath Ramachandra Iyer, Bangalore (IN)

(73) Assignee: Wipro Limited, Karnataka (IN)

(*) Notice: Subject to any disclaimer, the term of this patent is extended or adjusted under 35 U.S.C. 154(b) by 1316 days.

(21) Appl. No.: 16/043,209

(22) Filed: Jul. 24, 2018

(65) Prior Publication Data

US 2019/0370697 A1 Dec. 5, 2019

(30) Foreign Application Priority Data

Jun. 5, 2018 (IN) .............................. 201841021050

(51) Int. Cl.
| | | |
|---|---|---|
| *G06N 20/00* | (2019.01) | |
| *G06N 5/04* | (2023.01) | |
| *G06N 3/08* | (2023.01) | |
| *G06N 5/00* | (2023.01) | |
| *G06N 3/082* | (2023.01) | |
| *G06F 18/23* | (2023.01) | |
| *G06F 18/20* | (2023.01) | |
| *G06N 7/01* | (2023.01) | |

(52) U.S. Cl.
CPC .............. *G06N 20/00* (2019.01); *G06F 18/23* (2023.01); *G06F 18/285* (2023.01); *G06N 3/08* (2013.01); *G06N 3/082* (2013.01); *G06N 5/00* (2013.01); *G06N 5/04* (2013.01); *G06N 7/01* (2023.01)

(58) Field of Classification Search
CPC .......... G06N 20/00; G06N 3/08; G06N 3/082; G06N 5/00; G06N 5/04; G06N 7/005; G06K 9/6218; G06K 9/6227
USPC .......................................................... 706/12
See application file for complete search history.

(56) References Cited

U.S. PATENT DOCUMENTS

| | | | | |
|---|---|---|---|---|
| 9,189,745 | B2 * | 11/2015 | Hawkins ............... | G06N 3/0472 |
| 11,366,455 | B2 * | 6/2022 | Cella .................... | G01M 13/028 |

(Continued)

OTHER PUBLICATIONS

Samek, et al., "Explainable Artificial Intelligence: Understanding, Visualizing and Interpreting Deep Learning Models", arXiv: 1708.08296v1 [cs.AI] Aug. 28, 2017 (Year: 2017).*

(Continued)

*Primary Examiner* — Tsu-Chang Lee
(74) *Attorney, Agent, or Firm* — Finnegan, Henderson, Farabow, Garrett & Dunner, LLP

(57) ABSTRACT

This disclosure relates generally to artificial intelligence system, and more particularly to method and system for tracing a learning source of an explainable artificial intelligence (AI) model. In one example, the method may include receiving a desired behavior of the explainable AI model with respect to input data, generating a learning graph based on similarities among a plurality of learning sources with respect to the input data for the desired behavior and for a current behavior, retracing a learning of the explainable AI model by iteratively comparing the learning graph for the desired behavior and for the current behavior at each of a plurality of layers of the explainable AI model starting from an outer layer, and detecting the learning source responsible for the current behavior based on the retracing.

14 Claims, 6 Drawing Sheets

(56) References Cited

U.S. PATENT DOCUMENTS

2012/0156099 A1* 6/2012 Zhong .................... B82Y 15/00
422/82.02
2019/0311098 A1* 10/2019 Baldwin ................. G06F 21/32

OTHER PUBLICATIONS

Datta, A., et al., "Algorithmic Transparency via Quantitative Input Influence: Theory and Experiments with Learning Systems", IEEE 2016, pp. 598-617.
Gunning, D., "Explainable Artificial Intelligence (XAI)", DARPA 2017, pp. 1-18.
Koh, P., et al., "Understanding Black-box Predictions via Influence Functions", Proceedings of the 34th International Conference on Machine Learning, (2017), 11 pages.
Samek, W., et al., "Explainable Artificial Intelligence: Understanding Visualizing and Interpreting Deep Learning Models", International Telecommunications Union 2017, Special Issue No. 1, pp. 1-10.

* cited by examiner

METHOD AND SYSTEM FOR TRACING A LEARNING SOURCE OF AN EXPLAINABLE ARTIFICIAL INTELLIGENCE MODEL

TECHNICAL FIELD

This disclosure relates generally to artificial intelligence system, and more particularly to method and system for tracing a learning source of an explainable artificial intelligence model.

BACKGROUND

Artificial intelligence (AI) has gained significant importance in the recent past towards making computing devices more intelligent. AI may involve enabling a computing device to perceive its environment and to take appropriate actions so as to maximize its chance of successfully achieving its goals. In other words, AI enabled computing devices or AI system may mimic cognitive functions that are generally associated with human mind, such as learning and problem solving.

Generally, a robust AI system may learn from multiple sources. These learning sources may include, but may not be limited to, clusters of training data, environment (adaptive learning), or object-class pair applied by the user. Thus, the AI system may learn each of the outcomes from one or more input sources. Additionally, in some scenarios, the AI system may learn from already trained systems in other domains via transfer learning. In such scenarios, the outcome of the AI system may result from learning from different techniques. It may be important to isolate contribution from each of the different learning techniques. However, isolating the contribution from various learning techniques may require inferencing under corner scenarios where other learning techniques are not working.

As will be appreciated, the behavior of an AI system (for example, a classifier, a parser, or a natural language generator) depends on how the system is trained (or how the system learns). The AI system may be trained adaptively, incrementally and from multiple learning sources. However, in some scenarios, the AI system may be trained with erroneous data fed intentionally or unintentionally, causing the AI to exhibit unexpected or undesirable behavior. In such scenarios, it may be desirable to trace back the learning source that may have trained the AI system for its exhibited behavior so as to take a corrective action.

However, existing techniques are limited in tracing back the learning source which may have resulted in a specific learning so as to exhibit a specific behavior. For example, some of the existing techniques may provide an explanation for a particular classification by tracing back to features of a given input but not the learning source. Thus, it may be very difficult to trace back which learning source may have trained the AI system for its specific behavior under specific conditions. This limitation may be further compounded in self-learning system based on similar patterns.

SUMMARY

In one embodiment, a method for tracing a learning source of an explainable artificial intelligence (AI) model is disclosed. In one example, the method may include receiving a desired behavior of the explainable AI model with respect to input data. The method may further include generating a learning graph based on similarities among a plurality of learning sources with respect to the input data for the desired behavior and for a current behavior. The method may further include retracing a learning of the explainable AI model by iteratively comparing the learning graph for the desired behavior and for the current behavior at each of a plurality of layers of the explainable AI model starting from an outer layer. The method may further include detecting the learning source responsible for the current behavior based on the retracing.

In one embodiment, a system for tracing a learning source of an explainable AI model is disclosed. The one example, the system may include a tracing device comprising at least one processor and a computer-readable medium storing instructions that, when executed by the at least one processor, cause the at least one processor to receive a desired behavior of the explainable AI model with respect to input data. The computer-readable medium storing instructions, on execution, may further cause the processor to generate a learning graph based on similarities among a plurality of learning sources with respect to the input data for the desired behavior and for a current behavior. The computer-readable medium storing instructions, on execution, may further cause the processor to retrace a learning of the explainable AI model by iteratively comparing the learning graph for the desired behavior and for the current behavior at each of a plurality of layers of the explainable AI model starting from an outer layer. The computer-readable medium storing instructions, on execution, may further cause the processor to detect the learning source responsible for the current behavior based on the retracing.

In one embodiment, a non-transitory computer-readable medium storing computer-executable instructions for tracing a learning source of an explainable AI model is disclosed. In one example, the stored instructions, when executed by a processor, may cause the processor to perform operations including receiving a desired behavior of the explainable AI model with respect to input data. The operations may further include generating a learning graph based on similarities among a plurality of learning sources with respect to the input data for the desired behavior and for a current behavior. The operations may further include retracing a learning of the explainable AI model by iteratively comparing the learning graph for the desired behavior and for the current behavior at each of a plurality of layers of the explainable AI model starting from an outer layer. The operations may further include detecting the learning source responsible for the current behavior based on the retracing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
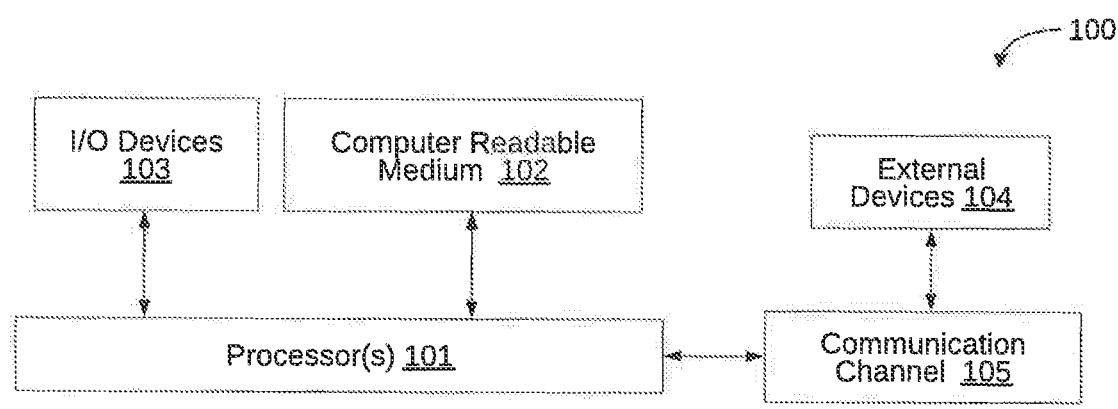
FIG. 1 is a block diagram of an exemplary system for tracing a learning source of an explainable artificial intelligence (AI) model, in accordance with some embodiments of the present disclosure.

Referring now to FIG. 1, an exemplary system 100 for tracing learning source of an artificial intelligence (AI) model is illustrated, in accordance with some embodiments of the present disclosure. In some embodiments, the system 100 may include a computing device that may communicate with an AI system implementing the AI model. Additionally, in some embodiments, the system 100 may itself be an AI system implementing the AI model. For example, the system 100 may include, but may not be limited to, server, desktop, laptop, notebook, netbook, tablet, smartphone, mobile phone, or other processor enabled devices. The system 100 may implement a tracing device so as to trace a learning source of an explainable artificial intelligence (AI) model. As will be described in greater detail in conjunction with FIGS. 2-5, the tracing device may receive a desired behavior of the explainable AI model with respect to input data, generate a learning graph based on similarities among a plurality of learning sources with respect to the input data for the desired behavior and for a current behavior, retrace a learning of the explainable AI model by iteratively comparing the learning graph for the desired behavior and for the current behavior at each of a plurality of layers of the explainable AI model starting from an outer layer, and detect the learning source responsible for the current behavior based on the retracing.

The system 100 may include one or more processors 101, a computer-readable medium (e.g., a memory) 101, and input/devices 103. The computer-readable storage medium 102 may store instructions that, when executed by the one or more processors 101, cause the one or more processors 101 to trace a learning source of an explainable AI model, in accordance with aspects of the present disclosure. The computer-readable storage medium 102 may also store various data (e.g., learning sources, training data, training environment, object-class pairs, hierarchy of learning sources, sequence graph, AI model, desired behavior, current behavior, randomly selected set of learning sources, learning graph, probabilities for each of the layers of AI model, distance metrics, classification model, correct classification, erroneous classification, etc.) that may be captured, processed, and/or required by the system 100. The system 100 may interact with a user via input/devices 103. For example, the system 100 may interact with the user via a user interface accessible via a display. The system 100 may also interact with one or more external devices 104 over a communication network 105 for sending or receiving various data. The external devices 104 may include, but are not limited to, remote servers, digital devices, computing systems that may or may not be AI enabled.

Figure 2:
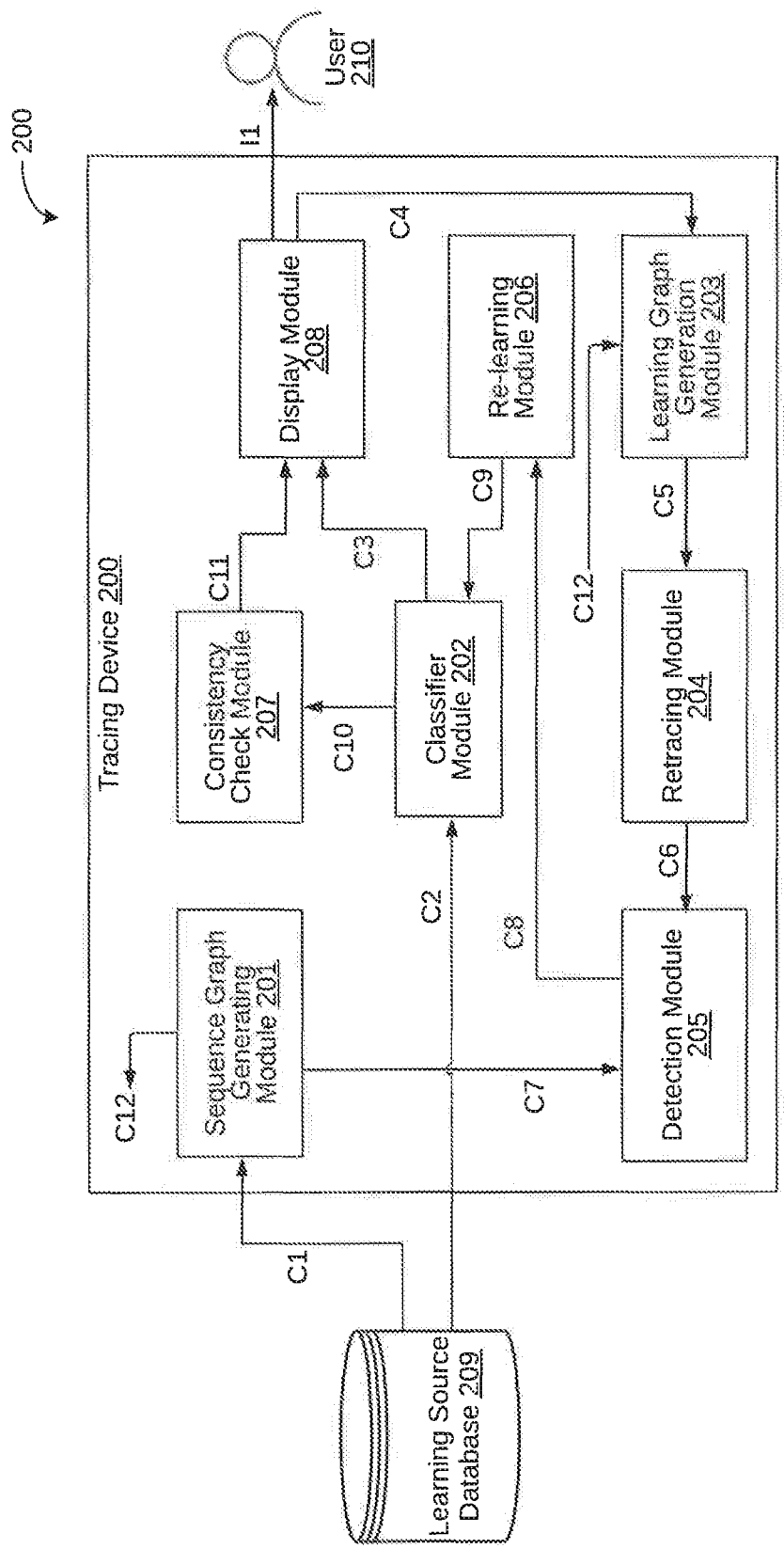
FIG. 2 is a functional block diagram of a tracing device, implemented by the system of FIG. 1, in accordance with some embodiments of the present disclosure.

Referring now to FIG. 2, a functional block diagram of the tracing device 200, implemented by the system 100 of FIG. 1 is illustrated, in accordance with some embodiments of the present disclosure. The tracing device 200 may include various modules that perform various functions so as to perform tracing of learning source of artificial intelligence system. In some embodiments, the tracing device 200 may include a sequence graph generating module 201, a classifier module 202, a learning graph generation module 203, a retracing module 204, a detection module 205, a re-learning module 206, a consistency check module 207, and a display module 208. Additionally, in some embodiments, the tracing device 200 may be communicatively coupled to a learning source database 209. In some embodiments, the tracing device 200 may interact with a user 210. As will be appreciated by those skilled in the art, all such aforementioned modules and the database 201-209 may be represented as a single module or a combination of different modules. Moreover, as will be appreciated by those skilled in the art, each of the modules and the database 201-209 may reside, in whole or in parts, on one device or multiple devices in communication with each other.

The learning source database 209 may store a plurality of learning sources. In some embodiments, learning sources may include at least one of a cluster of training data, a training environment, or an object-class pair applied by the user. The learning source database 209 may further provide the plurality of learning sources to the sequence graph generating module 201.

The sequence graph generating module 201 may be communicatively coupled to the learning source database 209 via a connector C1. Through the connector C1, the training data may be sent to the sequence graph generation unit. The sequence graph generating module 201 may receive the plurality of learning sources from the learning source database 209. The sequence graph generating module 201 may further organize the plurality of learning sources received from the learning source database 209 in a hierarchical fashion. As may be appreciated, the learning source database 209 may employ any suitable technique known in the art to organize the plurality of learning sources in a hierarchical fashion. As may be appreciated, in some embodiments, each level of the hierarchy may have a representative training data set.

The classifier module 202 may be communicatively coupled to the learning source database 209 via a connector C2. The learning source database 209 may receive data from the classifier model via the C2 connector. The classifier module 202 may be communicatively coupled to the learning source database 209 via a connector C2. The classifier module 202 may receive input that is to be classified. The classifier module 202 may further classify the input data into a classification. It may be noted that the classifier module 202 may be initially trained by the learning source database 209 using a known learning source. Based on the training received from the known learning source, the classifier module 202 may classify input data into a classification.

However, in some embodiments, the classifier module 202 may classify the input data into an erroneous classification due to incorrect training received from the learning source. It may be noted that the classified input data may be later validated during a validation phase. During the validation phase, the misclassification may be detected by the classifier module 202. In some embodiments, a golden reference may be used to cross-check and evaluate the detection of misclassification. It may be further noted that in the cases of misclassification, the classifier module 202 may require correction for the erroneous classification of the input data. As it will be explained later in detail, in cases of misclassification of the input data, the learning source responsible for the current behavior (misclassification) may be traced. In some embodiments, re-learning happens along with the misclassified data so that the training device 200 may see them as distinct data although they are very close related to each other with respect to their features or properties.

The learning graph generation module 203 may be communicatively coupled to the display module 208 via connector C4 and to the sequence graph generating module 201 via connector C12. The learning graph generation module 203 may receive the user input or selected (correct) classification via the C4 connector. The learning graph generation module 203 may further receive hierarchical data with respect to learning sources via the C12 connector so as to fix the reference data points required for computation of the learning graph. The learning graph generation module 203 my further be communicatively coupled to retracing module 204 via connector C5. The learning graph generation module 203 may be configured to generate a learning graph based on similarities among a plurality of learning sources with respect to the input data for the desired behavior and for a current behavior. In some embodiments, the learning graph generation module 203 may generate the learning graph with a randomly selected set of learning sources from among the plurality of learning sources based on a sequence graph. It may be noted that the sequence graph may be generated by organizing the plurality of learning sources in a hierarchical manner. Further, in some embodiments, the learning graph generation module 203 may generate the learning graphs with randomly selected triplets of learning sources in the hierarchy compared against the object being misclassified.

The retracing module 204 may be communicatively coupled to the learning graph generation module 203 via connector C5. The retracing module may receive data from the learning graph generation unit 203 via the C5 connector. The retracing module 204 may further be communicatively coupled to the detection module 205 via connector C6. The retracing module 204 may be configured to retrace a learning of the explainable AI system by iteratively comparing the learning graph for the desired behavior and for the current behavior at each of a plurality of layers of the explainable AI system starting from an outer layer. In some embodiments, the retracing module 204 may be configured to generate one or more probabilities for a layer through "Inverse Bayesian Fusion" (IBF) so as to separate learning components of one or more of the randomly selected set of learning sources.

The detection module 205 may be communicatively coupled to the retracing module 204 via connector C6. The detection module 205 may receive data from the retracing module 204 via the connector C6. The detection module 205 may further be communicatively coupled to the relearning module 208 via connector C8. The detection module 205 may further be communicatively coupled to the sequence graph generating module 201 via connector C7. The detection unit may receive the sequence graph from the sequence graph generating module 201 via the connector C7. The detection module 205 may detect the learning source responsible for the current behavior based on the retracing performed by retracing module 204. In some embodiments, the detection module may detect the learning source responsible for the current behavior based on selecting a learning source for an output with least distance metric in a direction of reducing gradient. In some embodiments, the process of retracing may be repeated until the detection module 205 may detect the learning source that was responsible for the current behavior learning to misclassification.

The re-learning module 206 may be communicatively coupled to the detection module 205 via a connector C8. The re-learning module 206 may receive the output of the detection module 205 connector C8 for re-training. The re-learning module 206 further may be communicatively coupled to the classifier module 202 via a connector C9, and the re-learning module 206 may receive data from the classifier module 202 via the connector C9. The re-learning module 206 may facilitate re-adjustment of the learning source and weights of AI model responsible for the current behavior that resulted in the erroneous classification of the input data. In some embodiments, the re-learning module 206 may be configured to update the AI model. It may be noted that in some embodiments, updating the AI model may include correcting a classification model by unlearning with respect to the learning source responsible for the erroneous classification and learning again with respect to a corrected learning source.

The consistency check module 207 may be communicatively coupled to the classifier module 202 via a connector C10. The consistency check module 207 may receive output from the classifier module 202 via a connector C10. The output from the classifier module 202 may be sued to analyze the consistency. The consistency check module 207 further may be communicatively coupled to the display module 208 via a connector C11. In some embodiments, the consistency check module 207 may check an impact on correcting the misclassification. It may be noted that the consistency check module 207 may check the impact after corrective action has been taken with respect to the misclassification. For example, the consistency check module 207 may check for the impact after the weights of the AI model are fine-tuned by the re-training module 206 so as to correct the mis-classification.

The display module 208 may be communicatively coupled to the classifier module 202 via the connector C3. The output of the classifier model may be rendered on the display module 208 via the C3 connector. The display module 208 further may be communicatively coupled to the consistency check module 207 via the connector C11, and the display module 208 may receive data from the consistency check module 207 via the connector C11. It may be noted that the output may include any mismatch before and after training. The display module 208 further may be communicatively coupled to the learning graph generation module 203 via the connector C4. The display module 208 may provide an interface for a user to interact with the system 100. By way of example, the user 210 may interact with the system 100 through the display module 208 for observing a misclassification. Further, the user 210 may interact with the display module 208 to provide a correct classification for the misclassification. It may be noted that based on the correct classification provided by the user 210, tracing back of the learning source that resulted in the current behavior (misclassification) of the input data may be performed. It may be noted that the when erroneous classification is detected during the consistency check (validation) phase, the user 210 may be informed about it through the display module 208. Further, the user may make a correction by inputting a correct classification.

As will be appreciated, each of the connections, C1-C12, may acquire or transfer data from one module or the database 201-209 to the other module or the database 201-209 using standard wired or wireless data connections means. For example, each of the connections, C1-C12, may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, and PCIe.

By way of an example, the tracing device 200 described above may generating a sequence graph based on the training data set. The tracing device 200 further may receive the right input from the user, and detecting an input performed by the user for selecting a desired class. The tracing device 200 further may generate a learning graph based on the similarity between training datasets, retrace the learning source responsible for misclassification from the outer layer, and detect which learning source was responsible for misclassification of the input data. The tracing device 200 further may perform a re-learning for the identified dataset, check the consistency of the retrained system, and provide a feedback through the display unit about the consequences of the changes made.

As will be appreciated, unlike existing techniques, the tracing device 200 described above may trace back to the leaning source responsible for the learning of the system, instead of a tracing back to only a particular input feature that resulted in the current behavior (misclassification). Further, unlike the existing techniques, the tracing device 200 isolates degree of learning from different learning sources, and thereby points to the learning source responsible for a particular behavior.

Various techniques are described to trace learning source of artificial intelligence system responsible for a particular behavior of an artificial intelligence (AI) system. By way of example, the techniques may include traversal along the common path of learning from two or more sources of the data. The techniques further include identifying a right path (learning source) at each node, and proceeding with the traversal until the learning source is reached. The techniques further provide for unlearning the erroneous learning. For example, if the system misclassifies apple as orange, the techniques may trace back the learning source that was responsible for the misclassification. The techniques further provide for correcting the incorrect learning (i.e. unlearning and re-learning). The techniques include generating a sequence graph from the learning sources. Further, a knowledge graph (learning graph) is generated using a weight vector. The weights may be treated as nodes of the knowledge graph, and the output behavior of the system is traced back based on the knowledge graph and the sequence graph. As a result, the learning source responsible for the incorrect learning is identified.

As a result, the various techniques for tracing learning source of artificial intelligence system, as described above, reduce the requirement of learning source. The techniques further support targeted and optimal learning of the AI system. Furthermore, the techniques help in reducing errors in the system output, and father help to reduce and correct errors in future operations.

It should be noted that the tracing device 200 may be implemented in programmable hardware devices such as programmable gate arrays, programmable array logic, programmable logic devices, or the like. Alternatively, the tracing device 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for tracing a learning source of an explainable AI. For example, the exemplary system 100 and the associated tracing device 200 may perform tracing the learning source responsible for a current behavior of an explainable AI system by the processes discussed herein. In particular, as will be appreciated by those of ordinary skill in the art, control logic and/or automated routines for performing the techniques and steps described herein may be implemented by the system 100 and the associated tracing device 200, either by hardware, software, or combinations of hardware and software. For example. suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
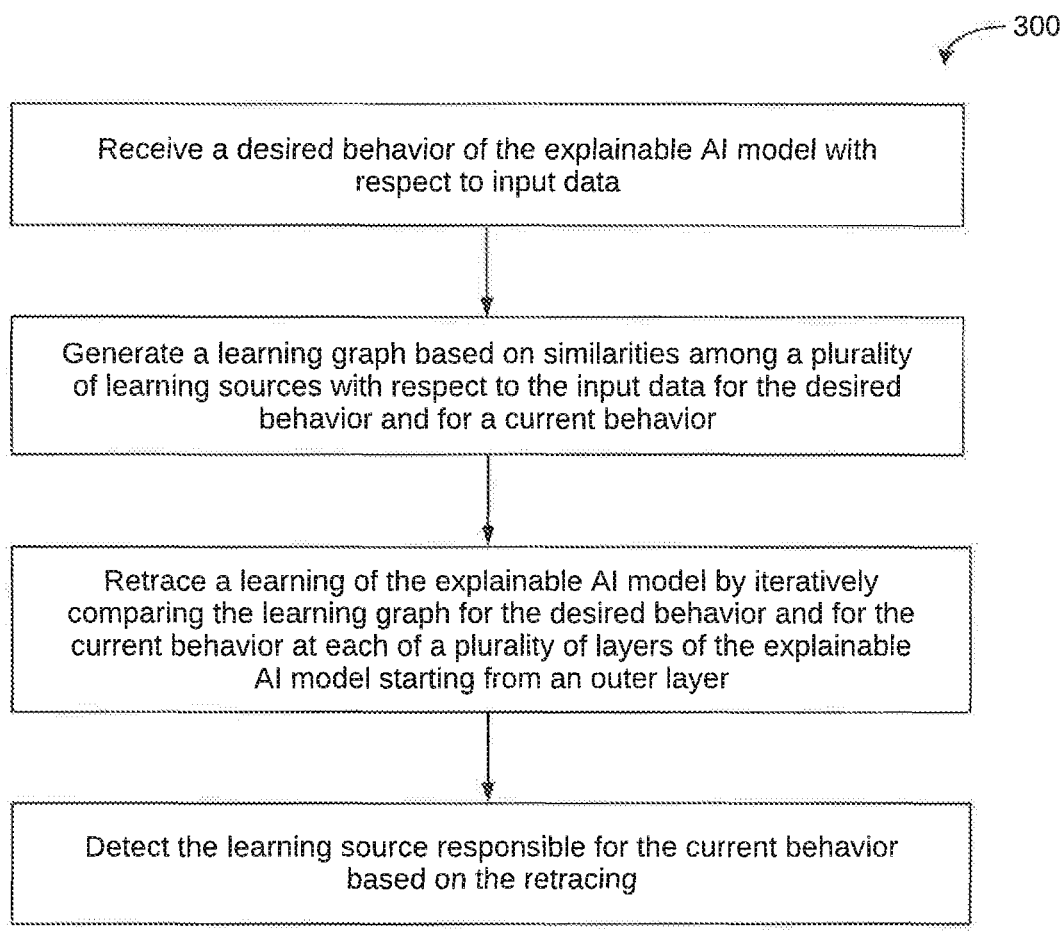
FIG. 3 is a flow diagram of an exemplary process for tracing a learning source of an explainable AI model, in accordance with some embodiments of the present disclosure.

For example, referring now to FIG. 3, exemplary control logic 300 for tracing a learning source of an explainable AI model via a system, such as system 100, is depicted via a flowchart in accordance with some embodiments of the present disclosure. As illustrated in the flowchart, the control logic 300 may include the steps of receiving a desired behavior of the explainable AI model with respect to input data at step 301, generating a learning graph based on similarities among a plurality of learning sources with respect to the input data for the desired behavior and for a current behavior at step 302, retracing a learning of the explainable AI model by iteratively comparing the learning graph for the desired behavior and for the current behavior at each of a plurality of layers of the explainable AI model starting from an outer layer at step 303, and detecting the learning source responsible for the current behavior based on the retracing at step 304. It should be noted that, in some embodiments, the learning sources may include at least one of a cluster of training data, a training environment, or an object-class pair applied by the user.

In some embodiments, the control logic 300 may further include the step of generating a sequence graph by organizing the plurality of learning sources in a hierarchical manner. Additionally, in some embodiments, generating the learning graph at step 302 may include generating the learning graph with a randomly selected set of learning sources from among the plurality of learning sources based on the sequence graph. It should be noted that, in some embodiments, the randomly selected set of learning sources may include a randomly selected learning source, a learning source hierarchically above the randomly selected learning source, and a learning source hierarchically below the randomly selected learning source.

In some embodiments, generating the learning graph at step 302 may include generating one or more probabilities for a layer through Inverse Bayesian Fusion (IBF) so as to separate learning components of one or more of the randomly selected set of learning sources. Additionally, in some embodiments, the one or more probabilities for the layer may be computed based on one or more distance metrics between output of the layer and outputs of a previous layer. It should be noted that, in some embodiments, each of the one or more distance metrics may be a function of one or more distances between an output of the layer and outputs of the previous layer and one or more probabilities of the previous layer. Further, in some embodiments, detecting the learning source at step 304 may include selecting a learning source for an output with least distance metric in a direction of reducing gradient.

In some embodiments, the control logic 300 may further include the step of updating the AI model with respect to the learning source. Additionally, in some embodiments, updating the AI model may include unlearning with respect to the learning source responsible for the current behavior and learning again with respect to a corrected learning source. As will be appreciated, in some embodiments, the current behavior may include an erroneous classification of the input data and the desired behavior may include a correct classification of the input data. In such embodiments, updating the AI model may include correcting a classification model by unlearning with respect to the learning source responsible for the erroneous classification and learning again with respect to a corrected learning source. Further, in some embodiments, the control logic 300 may further include the step of validating the updated AI model using additional test data.

Figure 4:
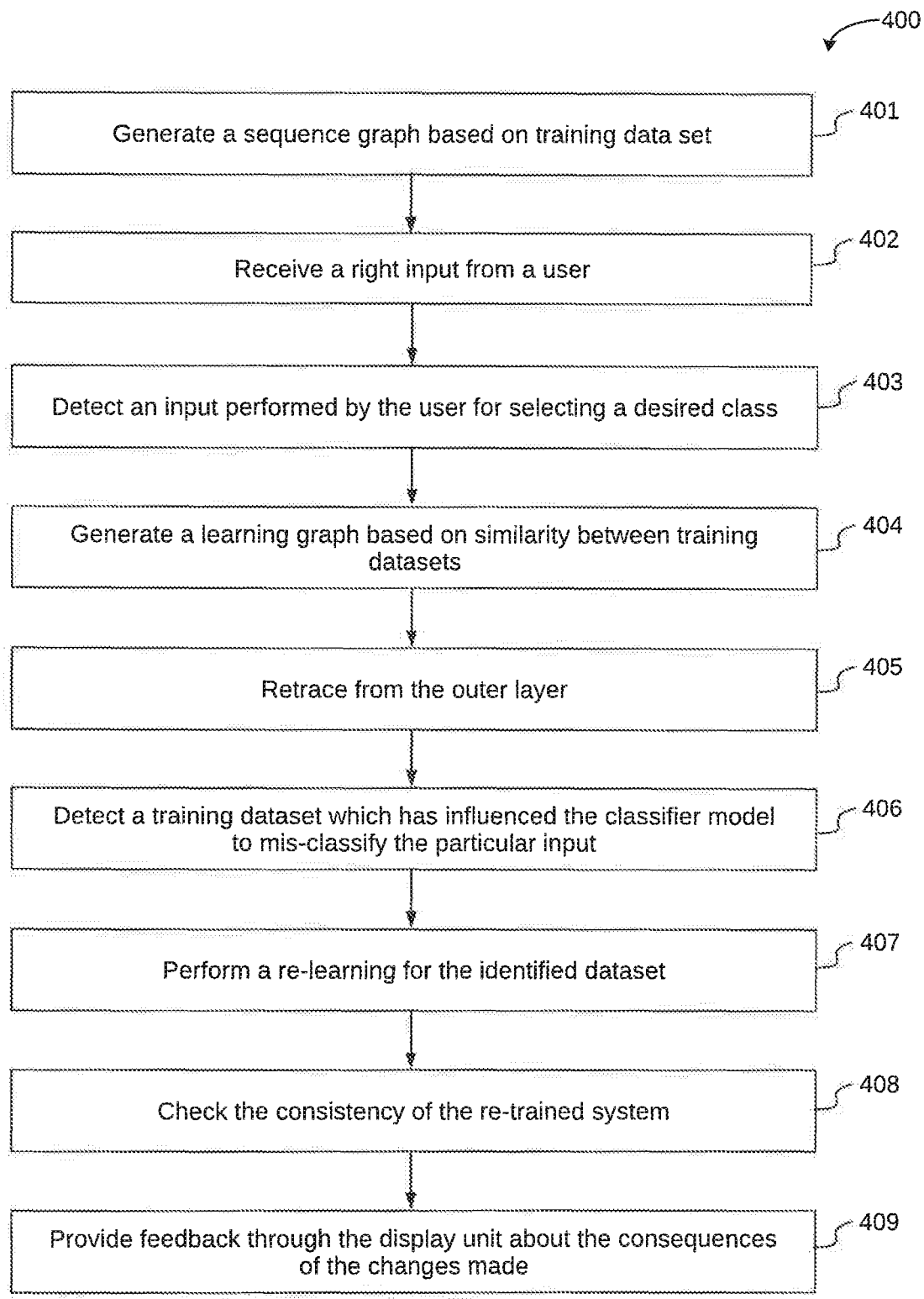
FIG. 4 is a flow diagram of a detailed exemplary process for tracing a learning source of an explainable AI model, in accordance with some embodiments of the present disclosure.

Referring now to FIG. 4, exemplary control logic 400 for tracing learning source of an explainable artificial intelligence (AI) system is depicted in greater detail via a flowchart in accordance with some embodiments of the present disclosure. As illustrated in the flowchart, at step 401, the control logic 400 may generate a sequence graph based on training data set. As will be appreciated that it may be useful to point to test vectors which may be responsible for imparting learning to the explainable AI system. If the data is organized in a sorted fashion, it may be possible to identify a dataset of interest apart from groups and groups of groups of the data that exhibit the similar patterns. By way of example, a class of "cat" may include a single cat, a cat with other small objects in the background, multiple cats, a cat in the middle of trees, a cat surrounded by many animals and trees, and so on. An exemplary organization of images for training data may be represented in the following manner:

Cat>Cat with objects in the back ground>Multiple Cats>Cat in the middle of trees>Cat surrounded by many animals and trees It may be noted that the images may be clustered around one of the classes based on the similarity to form a training set (learning source). In some embodiments, the similarities may be computed in filtered domain using a set of filters. In some embodiment, the set of filters may be same as those used in first layer of convolutional neural network (CNN). Further, initially, candidate test cases may be compared based on the above mentioned organization. Thereafter, based on the similarities in the filtered output, candidate test cases may be clustered into same sub-group of training datasets (learning sources). In some embodiments, a metric of Kullback-Leibler divergence (KL divergence) or Bhattacharya distance may be used to compute the similarity. In some embodiments, a confidence level or probability of the class may be used for ordering the data. By way of example, test cases with 10-20% accuracy may be grouped as one group, test cases with 20-30% accuracy may be grouped together as another group, and so on.

As may be appreciated, the prices of sequence generation may be an offline process. Further, the process of sequence generation may be performed one time by running the technique so as to sort and cluster data into various levels of abstractions of similarity. In some embodiments, a training data (learning source) may be randomly selected and the objects in the input data may be identified. By way of example, "mango tree bearing fruits" may be a candidate input for a classification of "mango". This input ("mango tree bearing fruits") may lie at a level above "mango" and a level below "mango orchid" (and also below "fruit garden"). It may be noted that this organization may be virtual, and the associated data may not actually be altered, but indices related to the data may be noted and stored as nodes. Further, the main cluster nodes may be fixed. Individual test cases may be compared with these clusters through distance metric. Further, based on the comparison, the individual test cases may be clustered.

At step 402, the control logic 400 may receive an input from a user. In some embodiments, the input may be received by the classifier module 202 through a display module 208. The user may identify a misclassification, and may isolate the misclassified input. By way of an example, if the input is a physical object, such as a "banana", the user may upload an image of the "banana". In some embodiment, the identification of the misclassified object may be done offline using validation data having a golden reference. In some embodiments, live data may be supported to allow the user to correct the misclassification.

At step 403, the control logic 400 may detect an input performed by the user for selecting the desired class. The system may detect that there is a misclassification. Further, at this step, the user may select the correct class to which the misclassified object actually belongs. At this point of time, the system knows the misclassification, the correct class, and the erroneously selected class, By way example, a "banana" may be misclassified as "mango". Thus, the system may be required to detect a training dataset (learning source) which led to misclassification of "banana" as "mango".

At step 404, the control logic 400 may generate a learning graph based on the similarity between training datasets, It may be noted that the learning graph may be a layer-wise output for the training data organized hierarchically. In order to generate the learning graph, a cluster node may be randomly selected from the user-selected class which is to be traced back. Thereafter, targets may be generated. In some embodiments, the targets may include learning graph for the cluster node (randomly selected from the user-selected class which is to be traced back), a node belonging to a level above the cluster node, and a node belonging to a level below the cluster node. Further, a learning graph of the misclassified input may be generated. The learning graphs of the cluster node and the misclassified input may be compared in the subsequent steps.

At step 405, the control logic 400 may preform retracing. In some embodiments, the retracing may be performed by the retracing module 204. In some embodiments, the retracing may be from the last layer. Further, in some embodiments, the learning graphs of the target and the inputs may be compared to obtain three distance metrics. The distance metrics may be normalized to obtain a sum "P". As may be appreciated, a component "1−P" may exist due to the learning from unknown data sets. By way of example, distance metrics at kth layer may be represented as: dk1, dk2 and dk3.

It may be noted that the distance metric at a layer for a cluster may represent a proportion (fraction) of learning in a network at the layer from that particular cluster. In some embodiments, the network may be selected from a convolutional neural network (CNN), a deep neural network (DNN), etc. By way of an example, if, based on the comparison, the matching is completely due to features of one particular cluster with no contribution from the other two clusters, then the cluster is said to match 100%, and correspondingly, the distance metric becomes "P".

As mentioned earlier, the multi-dimensional outputs at kth layer of the network for representative datasets from the three clusters may be represented as "k1", "k2" and "k3". In some embodiment, "Inverse Bayesian Fusion" may be used to determine contribution of previous layers to estimate these probabilities. As will be appreciated, the "Inverse Bayesian Fusion" theorem to compute the contribution of the components from the mixture may be realizable using the same architecture used to compute Bayesian fusion of components. The "Inverse Bayesian Fusion" is further explained in detail in conjunction with FIG. 5.

Figure 5:
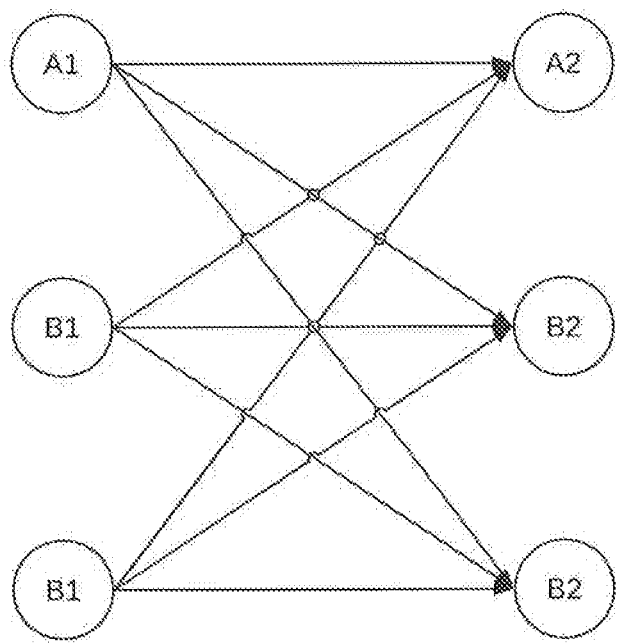
FIG. 5 is a schematic representation of generating probabilities through Inverse Bayesian Fusion (IBF).

Referring now to FIG. 5, a representation of "Inverse Bayesian Fusion" for determining contribution of previous layers to estimate probabilities is illustrated in accordance with some embodiments of the present disclosure. The conditional probabilities may be computed from distance between corresponding layer outputs. For example, p(A2|A1) may be computed by calculating the distance between "K1" at layer "k" and layer "k−1". The process may be initiated from the last layer and may proceed to the first layer. For each layer, previous layer probabilities may be used. For example, in order to compute p(A2), the probability p(A1) is used.

Thereafter, the distance metrics "dk1", "dk2", and "dk3" may be multiplied by p(Ak), p(Bk), and p(Ck) to obtain actual probabilities at $k^{th}$ layer, thereby eliminating learning from other inputs. In the first layer, the values may be used for comparison as they may isolate the influence of learning from other datasets.

Returning back to FIG. 4, at step 406, the control logic 400 may detect a training dataset (learning source) which may have influenced the misclassification of an input. In some embodiments, the detection module 205 may detect a training dataset which may have influenced the classifier module 202 to misclassify a particular input data. In order to do so, in some embodiments, a node with lowest metric in the first state may be taken as a selected node. Further, the same may be repeated for all the other nodes of which the smaller metric node is a part. In other words, two mode nodes may be selected with the smallest metric in the direction of reducing gradient (i.e. outer layer to the inner layer). The process may be repeated for the hierarchy within this node until the training set is reached.

At step 407, the control logic 400 may perform a re-learning for the identified dataset. In some embodiments, the re-learning module 206 may perform the re-learning for the identified dataset. It may be noted that the re-learning may be performed with both the test cases, i.e. the misclassified classified object and the test case that was responsible for incorrect learning. As a result, the system may learn that the two cases are distinct although the features may ramble closely.

At step 408, the control logic 400 may check the consistency of the retrained system. In some embodiments, the consistency may be checked by the consistency check module 207. In some embodiments, the classifier model 202 may now be applied with validation data from the group to which the identified test case belongs. As a result, the misclassification due to the closeness of the two test cases may be eliminated. Further, the classifier model 202 may be applied with validation test cases. As a result, the misclassification due to test cases which are close to the identified test case may be eliminated. In an embodiment, the consistency check may be made a part of training the classifier model 202.

At step 409, the control logic may provide feedback about the consequences of the changes made. In some embodiments, the feedback may be provided through the display module 208. Through the display module 208, results of consistency check may be rendered to the user. Further, at this step, the user may take a call on invoking another iteration of execution of method that may implement the proposed mechanism. By performing another iteration, the degree of confidence, may be further increased. In other words, the probability of matching with a class observed at the output of the classifier model may be further increased.

Some exemplary use case scenarios for the above technique are given below:

Use case Scenario I (Fruit misclassification): A user is using a robot to classify banana and mango fruits. However, the classifier (AI system) mistakenly classifies a ripe banana as mango. The user takes it out and wants to make correction in the configurable classifier. If the user re-trains the AI system to classify the banana in the classification of banana, a genuine mango sharing features with banana may also get classified in banana classification. Thus, the user may trace back the training data (learning source) for mango using the above techniques that generated features similar to the banana, and further re-train the AI system.

Use case Scenario II: A user comes across an issue in the power supply jack of a mobile phone. The user takes an image of the power supply jack, and uploads the image on the internet seeking help to fix it. However, an internet-based image classifier (AI system) wrongly classifies the power supply jack as an audio jack, and prescribes different set of steps as solution. When the user identifies and points out that the power supply jack is misclassified as audio jack, the above techniques may be used to make the correction to the classifier, and avoid similar mistakes in the future.

Use case scenario III: A user is trying to sell online his book on applications of Artificial Intelligence (AI) in which cloud computing is a chapter. However, the book is misclassified in "cloud computing" instead of "AI" due to over emphasis of cloud application in the book, The misclassification is corrected by using the above techniques.

Use case scenario IV: A user applies for a home loan with a set of documents and data, such as total assets, withdrawals made in last 6 months, and deposits made. However, the request for the loan is rejected by the system, due to the maximum amount withdrawn per day, which was lower than the threshold limit. As a result, the request is misclassified as not meeting the criteria for loan approval. The same could be corrected and avoided using the above techniques of tracing learning source for the AI system.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
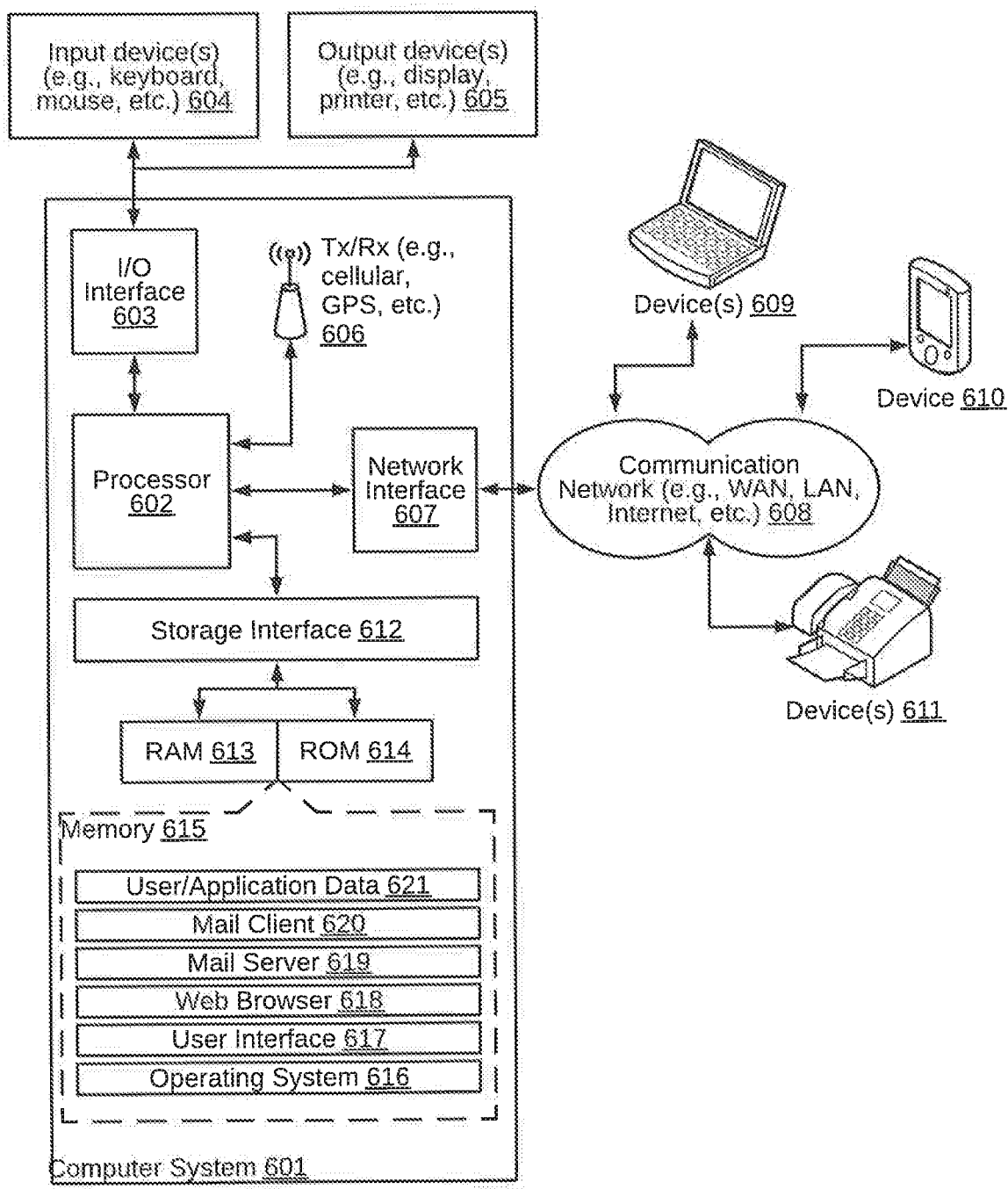
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for tracing a learning source of an AI model. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RE) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608. the computer system 601 may communicate with devices 609, 610, and 611. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®. etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathlnterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACK-BERRY® OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement a web browser 618 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 601 may implement a mail server 619 stored program component. The mail server may be an Internet mail server such as MICROSOFT° EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement a mail client 620 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store user/application data 621, such as the data, variables, records, etc. (e.g., learning sources, training data, training environment, object-class pairs, hierarchy of learning sources, sequence graph, AI model, desired behavior, current behavior, randomly selected set of learning sources, learning graph, probabilities for each of the layers of AI model, distance metrics, classification model, correct classification, erroneous classification, etc.) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for an efficient and effective way of tracing learning source of an artificial intelligence system. The claimed steps as discussed above are not routine, conventional, or well understood in the art, as the claimed steps enable the following solutions to the existing problems in conventional technologies. In particular, the techniques disclosed herein reduce the requirement for a large number of learning sources and for an accuracy of learning sources as required by existing or convention techniques. This is enabled by the current techniques by retracing any erroneous learning to erroneous data set, unlearning the erroneous learning, and re-learning with a correct data set. As will be appreciated, existing techniques are not able to retrace their learning and detect the learning source responsible for the specific learning. The techniques described in the various embodiments discussed above further support targeted and optimal learning of the AI system. Furthermore, the techniques described in the various embodiments discussed above help in reducing errors in the system output, and also help to reduce and correct errors in future operations.

The specification has described method and system for tracing learning source of artificial intelligence system. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of tracing a learning source of an explainable artificial intelligence (AI) model, the method comprising:

receiving, by a tracing device, a desired behavior of the explainable AI model with respect to input data, wherein the desired behavior comprises a correct classification of the input data;

determining, by the tracing device, similarities among a plurality of learning sources with respect to the input data for the desired behavior and for a current behavior, wherein the similarities are determined using a set of filters used in a first layer of convolutional neural network (CNN);

generating, by the tracing device, a learning graph based on the similarities among the plurality of learning sources with respect to the input data for the desired behavior and for a current behavior, wherein the current behavior comprises an erroneous classification of the input data;

retracing, by the tracing device, a learning of the explainable AI model by iteratively comparing the learning graph for the desired behavior and for the current behavior at each of a plurality of layers of the explainable AI model starting from an outer layer, wherein the learning graph is based on one or more probabilities generated for a layer through Inverse Bayesian Fusion (IBF) so as to separate learning components of one or more of a randomly selected set of learning sources;

detecting, by the tracing device, the learning source from the randomly selected set of learning sources responsible for the current behavior based on the retracing, wherein the learning source is detected based on selecting the learning source for an output with a least distance metric in a direction of reducing gradient, and wherein the retracing is repeated until the learning source responsible for the current behavior is detected;

correcting, by the tracing device, a classification model by unlearning with respect to the learning source responsible for the erroneous classification and learning again with respect to a corrected learning source;

providing, by the tracing device, feedback about performance of the corrected learning source in order to check consistency of the corrected learning source;

providing, by a display module of the tracing device, an interface for displaying the feedback about the performance to a user; and receiving, by the tracing device, an input from the user related to invoking another iteration of execution based on the feedback, thereby increasing a degree of confidence.

2. The method of claim 1, wherein the learning sources comprises at least one of a cluster of training data, a training environment, or an object-class pair applied by the user.

3. The method of claim 1, further comprising generating a sequence graph by organizing the plurality of learning sources in a hierarchical manner.

4. The method of claim 3, wherein generating the learning graph comprises generating the learning graph with the randomly selected set of learning sources from among the plurality of learning sources based on the sequence graph.

5. The method of claim 4, wherein the randomly selected set of learning sources comprises a randomly selected learning source, a learning source hierarchically above the randomly selected learning source, and a learning source hierarchically below the randomly selected learning source.

6. The method of claim 1, wherein the one or more probabilities for the layer is computed based on one or more distance metrics between output of the layer and outputs of a previous layer.

7. The method of claim 6, wherein each of the one or more distance metrics is a function of one or more distances between an output of the layer and outputs of the previous layer and one or more probabilities of the previous layer.

8. The method of claim 1, further comprising validating the updated AI model using additional test data.

9. A system for tracing a learning source of an explainable artificial intelligence (AI) system, the system comprising:

a tracing device comprising at least one processor and a computer-readable medium storing instructions that, when executed by the at least one processor, cause the at least one processor to perform operations comprising:

receiving a desired behavior of the explainable AI model with respect to input data, wherein the desired behavior a correct classification of the input data;

determining similarities among a plurality of learning sources with respect to the input data for the desired behavior and for a current behavior, wherein the similarities are determined using a set of filters used in a first layer of convolutional neural network (CNN);

generating a learning graph based on the similarities among the plurality of learning sources with respect to the input data for the desired behavior and for a current behavior, wherein the current behavior comprises an erroneous classification of the input data;

retracing a learning of the explainable AI model by iteratively comparing the learning graph for the desired behavior and for the current behavior at each of a plurality of layers of the explainable AI model starting from an outer layer wherein the learning graph is based on one or more probabilities generated for a layer through Inverse Bayesian Fusion (IBF) so as to separate learning components of one or more of a randomly selected set of learning sources;

detecting the learning source from the randomly selected set of learning sources responsible for the current behavior based on the retracing, wherein the learning source is detected based on selecting the learning source for an output with a least distance metric in a direction of reducing gradient, and wherein the retracing is repeated until the learning source responsible for the current behavior is detected;

correcting a classification model by unlearning with respect to the learning source responsible for the erroneous classification and learning again with respect to a corrected learning source;

providing feedback about performance of the corrected learning source in order to check consistency of the corrected learning source;

providing an interface for displaying the feedback about the performance to a user; and receiving an input from the user related to invoking another iteration of execution based on the feedback, thereby increasing a degree of confidence.

10. The system of claim 9, wherein the operations further comprise generating a sequence graph by organizing the plurality of learning sources in a hierarchical manner.

11. The system of claim 10, wherein generating the learning graph comprises generating the learning graph with the randomly selected set of learning sources from among the plurality of learning sources based on the sequence graph, and wherein the randomly selected set of learning sources comprises a randomly selected learning source, a learning source hierarchically above the randomly selected learning source, and a learning source hierarchically below the randomly selected learning source.

12. The system of claim 1, wherein the one or more probabilities for the layer is computed based on one or more distance metrics between output of the layer and outputs of a previous layer, and wherein each of the one or more distance metrics is a function of one or more distances between an output of the layer and outputs of the previous layer and one or more probabilities of the previous layer.

13. The system of claim 9, further comprising:
validating the updated AI model using additional test data.

14. A non-transitory computer-readable medium storing computer-executable instructions for:
receiving a desired behavior of the explainable AI model with respect to input data, wherein the desired behavior a correct classification of the input data;
determining similarities among a plurality of learning sources with respect to the input data for the desired behavior and for a current behavior, wherein the similarities are determined using a set of filters used in a first layer of convolutional neural network (CNN);
generating a learning graph based on the similarities among the plurality of learning sources with respect to the input data for the desired behavior and for a current behavior, wherein the current behavior comprises an erroneous classification of the input data;
retracing a learning of the explainable AI model by iteratively comparing the learning graph for the desired behavior and for the current behavior at each of a plurality of layers of the explainable AI model starting from an outer layer, wherein the learning graph is based on one or more probabilities generated for a layer through Inverse Bayesian Fusion (IBF) so as to separate learning components of one or more of a randomly selected set of learning sources;
detecting the learning source from the randomly selected set of learning sources responsible for the current behavior based on the retracing, wherein the learning source is detected based on selecting the learning source for an output with a least distance metric in a direction of reducing gradient, and wherein the retracing is repeated until the learning source responsible for the current behavior is detected;
correcting a classification model by unlearning with respect to the learning source responsible for the erroneous classification and learning again with respect to a corrected learning source;
providing feedback about performance of the corrected learning source in order to check consistency of the corrected learning source; and
providing an interface for displaying the feedback about the performance to a user;
receiving an input from the user related to invoking another iteration of execution based on the feedback, thereby increasing a degree of confidence.

* * * * *